US012106425B1

(12) United States Patent
Patel

(10) Patent No.: US 12,106,425 B1
(45) Date of Patent: Oct. 1, 2024

(54) METHOD AND PROCESSING UNIT FOR MONITORING VIEWING PARAMETERS OF USERS IN AN IMMERSIVE ENVIRONMENT

(71) Applicant: ZEALITY INC, Pleasanton, CA (US)

(72) Inventor: Dipak Mahendra Patel, Pleasanton, CA (US)

(73) Assignee: Zeality Inc, Pleasanton, CA (US)

( * ) Notice: Subject to any disclaimer, the term of this patent is extended or adjusted under 35 U.S.C. 154(b) by 0 days.

(21) Appl. No.: 18/534,881

(22) Filed: Dec. 11, 2023

(51) Int. Cl.
  *G06T 15/10* (2011.01)
  *G06F 3/01* (2006.01)
  *G06T 7/70* (2017.01)

(52) U.S. Cl.
  CPC .............. *G06T 15/10* (2013.01); *G06F 3/013* (2013.01); *G06T 7/70* (2017.01); *G06T 2200/04* (2013.01); *G06T 2200/24* (2013.01)

(58) Field of Classification Search
  CPC ....... G06T 15/10; G06T 7/70; G06T 2200/04; G06T 2200/24; G06F 3/013
  See application file for complete search history.

(56) References Cited

U.S. PATENT DOCUMENTS

| | | | |
|---|---|---|---|
| 10,401,958 B2 | 9/2019 | Peana et al. | |
| 10,463,962 B2 | 11/2019 | Marks et al. | |
| 10,686,972 B2 * | 6/2020 | Rönngren | H04N 5/2628 |
| 11,100,697 B2 * | 8/2021 | Xu | H04N 21/44218 |
| 2010/0249592 A1 * | 9/2010 | Langeland | G06T 7/246 600/443 |
| 2018/0136724 A1 * | 5/2018 | Peana | G06F 3/16 |
| 2018/0210542 A1 * | 7/2018 | McLean | G06F 3/011 |
| 2019/0060756 A1 * | 2/2019 | Marks | A63F 13/525 |
| 2019/0228581 A1 * | 7/2019 | Dascola | G06F 3/048 |
| 2019/0228588 A1 * | 7/2019 | Rockel | G06F 3/016 |
| 2021/0343085 A1 * | 11/2021 | Chakravarthi | G06N 20/00 |
| 2022/0197306 A1 * | 6/2022 | Cella | G06N 3/088 |
| 2022/0214743 A1 * | 7/2022 | Dascola | G06F 3/017 |
| 2022/0287676 A1 * | 9/2022 | Steines | A61B 6/102 |
| 2022/0357731 A1 * | 11/2022 | Lekarczyk | G05B 23/0216 |
| 2024/0148464 A1 * | 5/2024 | Freeman | A61M 16/04 |
| 2024/0203075 A1 * | 6/2024 | Rintel | G06T 19/20 |
| 2024/0205370 A1 * | 6/2024 | Okvist et al. | G06F 3/04845 |

\* cited by examiner

*Primary Examiner* — Dmitriy Bolotin
(74) *Attorney, Agent, or Firm* — Riyon Rae Harding

(57) ABSTRACT

The present invention discloses to monitor viewing parameters of users in an immersive environment. Real-time inputs are received from sensors associated with participants in immersive environment. Inputs represent location data, gaze data, field of view (FOV) data, and movement data of the participants. Selection data indicating selected participants and selected viewing parameter is received from user. The inputs are processed to output the viewing parameters of the selected participants which include viewing angle, viewing range, viewing angle deviation, current FOV, relative location, and interaction status of the selected participants. A first set of pictorial representations is generated to represent the selected participants and selected viewing parameters. The first set of pictorial representations is displayed in a predefined region within FOV of the user in the immersive environment, to enable monitoring.

18 Claims, 12 Drawing Sheets

METHOD AND PROCESSING UNIT FOR MONITORING VIEWING PARAMETERS OF USERS IN AN IMMERSIVE ENVIRONMENT

FIELD OF THE PRESENT INVENTION

Embodiments of the present invention generally relate to monitoring a user within an immersive environment. In particular, embodiments of the present invention relate to a method and a processing unit for monitoring viewing parameters of users in the immersive environment.

BACKGROUND OF THE DISCLOSURE

In an immersive environment with multiple users, it may be challenging for a user to monitor actions and field of view of other users within the immersive environment. Conventional systems and methods teach to track and monitor a user's own actions, grazing directions, field of view, and so on. However, in some scenarios, there may be a need for a user to track and monitor other user's actions and field of view. For example, consider the immersive environment as a classroom environment. In such a case, a lecturer in the classroom may have a requirement to monitor what the students are viewing in the immersive environment.

U.S. Pat. No. 10,401,958B2 teaches to control a display for an immersive experience by tracking the gazing view of users. The system utilizes a processor, a gaze detector, and a Graphic Processing Unit (GPU) to detect the relative location of the users to the display, allocate a field of view on the display, center the display content within the field of view, and adjust color and brightness of display components based on color point control data.

U.S. Pat. No. 10,463,962B2 describes a method, system, computer media, and cloud systems for generating views of a virtual reality environment for a spectator. The method enables the spectator to view and control specific content within the environment by adjusting their proximity to the content, which automatically scales the content accordingly. Additionally, the spectator can adjust the viewing angle of the content by interacting with and positioning it to their preferred comfort.

Current systems and methods may teach to observe the direction of the user's gaze or the area they are looking at in a virtual environment. Moreover, based on the gathered data, the field of view can be adjusted or improved either manually or automatically. Nonetheless, none of the current systems and methods educate on monitoring a diverse range of viewing characteristics according to the user's preferences. Additionally, existing systems and methods do not teach the creation of a depiction for user actions or viewing parameters within the virtual environment. Consequently, it is not possible to achieve effective monitoring of all the user's actions related to their perspectives or views within the immersive environment.

Hence, there exists a requirement for a technique and processing unit that enables the dynamic monitoring of the viewing characteristics of all users in the virtual environment and offers a simplified presentation of the monitored data to individual users.

The information disclosed in this background of the disclosure section is only for enhancement of understanding of the general background of the disclosure and should not be taken as an acknowledgment or any form of suggestion that this information forms existing information already known to a person skilled in the art.

BRIEF SUMMARY OF THE DISCLOSURE

A method, a processing unit, and a non-transitory computer-readable medium for monitoring viewing parameters of users in an immersive environment. Initially, for enabling monitoring of the viewing parameters, one or more real-time inputs are received from sensors associated with each of plurality of participants of an immersive environment. The one or more real-time inputs represent at least one of location data, gaze data, field of view data and movement data of the plurality of participants. Further, a selection data is received from a user amongst the plurality of participants. The selection data indicates one or more selected participants amongst the plurality of participants and at least one selected viewing parameter amongst plurality of viewing parameters of the plurality of participants. Upon receiving the selection data, the one or more inputs are processed to output the plurality of viewing parameters of the one or more selected participants. The plurality of viewing parameters comprises at least one of viewing angle, viewing range, viewing angle deviation, current field of view, relative location and interaction status of the one or more selected participants. A first set of pictorial representations is generated to represent the one or more selected participants and corresponding selected viewing parameters, for the user. The first set of pictorial representations are displayed in a predefined region within field of view of the user in the immersive environment, to enable monitoring of the plurality of viewing parameters.

In a non-limiting embodiment, the present invention further comprises to prompt the user to dynamically input the selection data using one or more options in the predefined region.

In a non-limiting embodiment, the viewing angle deviation indicates deviation of the viewing angle of each of the one or more selected participants from a predefined viewing angle set by the user.

In a non-limiting embodiment, the relative location represents proximity between the one or more selected participants and the user, and amongst the one or more selected participants.

In a non-limiting embodiment, the interaction status comprises, at least one of indication of at least two participants amongst the one or more selected participants interacting with each other, indication of at least one of the one or more selected participants interacting with the user, and indication of at least one of the one or more selected participants interacting with participant amongst the plurality of participants other than the one or more selected participants.

In a non-limiting embodiment, the present invention further comprises tracking placement of one or more selected objects present in the immersive environment, generating a second set of pictorial representations including representation for the one or more selected objects and dynamically displaying the second set of pictorial representations in the predefined space relative to the at least one selected viewing parameters of the one or more selected participants.

The features and advantages of the subject matter hereof will become more apparent in light of the following detailed description of selected embodiments, as illustrated in the accompanying FIGUREs. As one of ordinary skill in the art will realize, the subject matter disclosed herein is capable of modifications in various respects, all without departing from the scope of the subject matter. Accordingly, the drawings and the description are to be regarded as illustrative.

BRIEF DESCRIPTION OF THE DRAWINGS

The present subject matter will now be described in detail with reference to the drawings, which are provided as illustrative examples of the subject matter to enable those skilled in the art to practice the subject matter. It will be noted that throughout the appended drawings, features are identified by reference numerals. Notably, the FIGUREs and examples are not meant to limit the scope of the present subject matter to a single embodiment, but other embodiments are possible by way of interchange of some or all of the described or illustrated elements and, further, wherein.

DETAILED DESCRIPTION OF THE EMBODIMENTS

Figure 1:
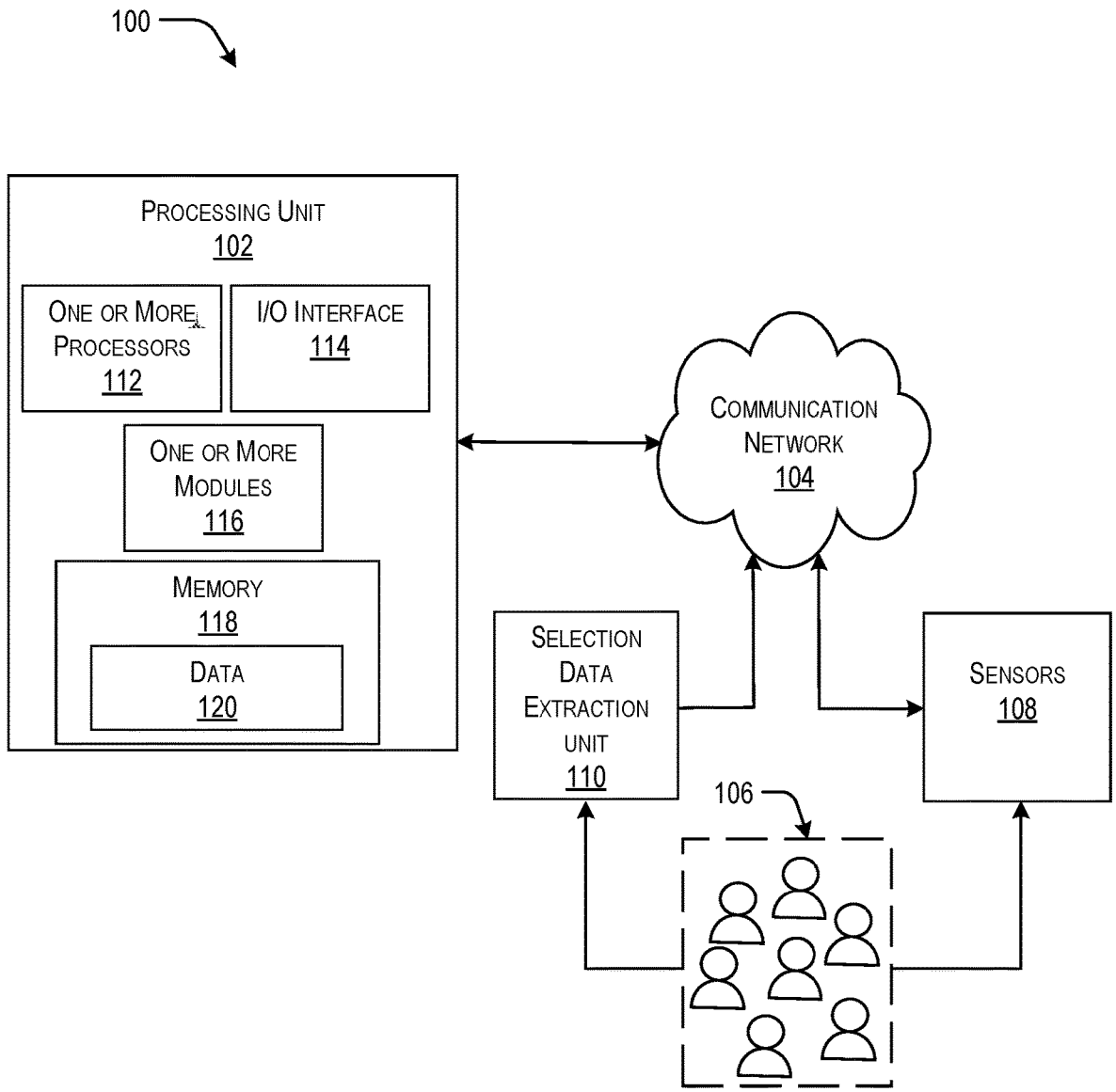
FIG. 1 illustrates an exemplary environment with a processing unit for monitoring viewing parameters of users in an immersive environment, in accordance with an embodiment of the present invention.

The detailed description set forth below in connection with the appended drawings is intended as a description of exemplary embodiments in which the presently disclosed invention can be practiced. The term "exemplary" used throughout this description means "serving as an example, instance, or illustration," and should not necessarily be construed as preferred or advantageous over other embodiments. The detailed description includes specific details to provide a thorough understanding of the presently disclosed invention. However, it will be apparent to those skilled in the art that the presently disclosed invention may be practiced without these specific details. In some instances, well-known structures and devices are shown in block diagram form in order to avoid obscuring the concepts of the presently disclosed invention.

Embodiments of the present invention include various steps, which will be described below. The steps may be performed by hardware components or may be embodied in machine-executable instructions, which may be used to cause a general-purpose or special-purpose processor programmed with the instructions to perform the steps. Alternatively, steps may be performed by a combination of hardware, software, and/or firmware.

Embodiments of the present invention may be provided as a computer program product, which may include a non-transitory, machine-readable storage medium tangibly embodying thereon instructions, which may be used to program the computer (or other electronic devices) to perform a process. The machine-readable medium may include but is not limited to, fixed (hard) drives, semiconductor memories, such as Read Only Memories (ROMs), Programmable Read-Only Memories (PROMs), Random Access Memories (RAMs), Erasable PROMs (EPROMs), Electrically Erasable PROMs (EEPROMs), flash memory or other types of media/machine-readable medium suitable for storing electronic instructions (e.g., computer programming code, such as software or firmware).

Various methods described herein may be practiced by combining one or more non-transitory, machine-readable storage media containing the code according to the present invention with appropriate standard computer hardware to execute the code contained therein. An apparatus for practicing various embodiments of the present invention may involve one or more computers (or one or more processors within the single computer) and storage systems containing or having network access to a computer program(s) coded in accordance with various methods described herein, and the method steps of the invention could be accomplished by modules, routines, subroutines, or subparts of a computer program product.

The terms "connected" or "coupled" and related terms are used in an operational sense and are not necessarily limited to a direct connection or coupling. Thus, for example, two devices may be coupled directly, or via one or more intermediary media or devices. As another example, devices may be coupled in such a way that information can be passed there between, while not sharing any physical connection. Based on the disclosure provided herein, one of ordinary skill in the art will appreciate a variety of ways in which connection or coupling exists in accordance with the aforementioned definition.

If the specification states a component or feature "may," "can," "could," or "might" be included or have a characteristic, that particular component or feature is not required to be included or have the characteristic.

As used in the description herein and throughout the claims that follow, the meaning of "a," "an," and "the" includes plural reference unless the context dictates otherwise. Also, as used in the description herein, the meaning of "in" includes "in" and "on" unless the context dictates otherwise.

The phrases "in an embodiment," "according to one embodiment," and the like generally mean the particular feature, structure, or characteristic following the phrase is included in at least one embodiment of the present disclosure and may be included in more than one embodiment of the present disclosure. Importantly, such phrases do not necessarily refer to the same embodiment.

It will be appreciated by those of ordinary skill in the art that the diagrams, schematics, illustrations, and the like represent conceptual views or processes illustrating systems and methods embodying this invention. The functions of the various elements shown in the figures may be provided through the use of dedicated hardware as well as hardware capable of executing associated software. Similarly, any switches shown in the figures are conceptual only. Their function may be carried out through the operation of program logic, through dedicated logic, through the interaction of program control and dedicated logic, or even manually, the particular technique being selectable by the entity implementing this invention. Those of ordinary skill in the art further understand that the exemplary hardware, software, processes, methods, and/or operating systems described herein are for illustrative purposes and, thus, are not intended to be limited to any particular name.

Embodiments of the present invention relate to a method, a processing unit, and a non-transitory computer-readable medium for monitoring viewing parameters for users in an immersive environment. In the present invention, location data, gaze data, field of view data, and movement data of a plurality of participants of the immersive environment are tracked dynamically. When a user selects to view or monitor a particular participant, tracked information of the particular participant is processed to output viewing parameters of the particular participant. Further, pictorial representation of the viewing parameters are generated and displayed to the user. This enables dynamic representation of viewing parameters of the participants and real-time monitoring to the user. Further, the user is enabled to select participants and desired viewing parameters to view and monitor.

FIG. 1 illustrates an exemplary environment 100 with processing unit 102 for monitoring viewing parameters for users in an immersive environment, in accordance with an embodiment of the present invention. As shown in FIG. 1, the exemplary environment 100 comprises the processing unit 102, a communication network 104, a plurality of users 106, sensors 108, and a selection data extraction unit 110. In an embodiment, the plurality of users 106 of the immersive environment may include a presenter and one or more attendees. The presenter may present content to the one or more attendees in the immersive environment. The exemplary environment 100 may be the immersive environment to which the plurality of users 106 are connected. In an embodiment, the immersive environment may be any environment that renders immersive content to the plurality of users 106. The immersive environment may be but is not limited to, an extended reality environment/immersive environment, a live-telecast environment, a content streaming environment, a visual communication environment, an online gaming environment, virtual 360° view of a scene, and so on. The content may include, but is not limited to, at least one of video data, audio data, image data, text data, graphics data, and so on. Usually, the presenter may be presenting the content to the one or more attendees in such an environment. Alternatively, a host, who may not be one of the plurality of users 106, may present the content to the plurality of users 106. In the present invention, the user refers to either the presenter, one of the plurality of participants, or the host. In an embodiment, the immersive environment may be a real-time communication session established amongst the plurality of users 106. The content may be but is not limited to, computer-generated data, real-time dynamically generated data, replayed data, pre-defined data, pre-stored data, live telecast data, and so on, that may be presented to the plurality of users 106. In an embodiment, the content may be a scene that is created by overlapping digital images of the scene. In an embodiment, the content may be sequence of scenes which are generated using multiple images. In an embodiment, the plurality of users 106 may be connected to the immersive environment via user devices. The user devices may be but are not limited to, at least one of a smartphone, a head-mounted device, smart glasses, a television, a PC, a tablet, a laptop, and so on. In an embodiment, each of the plurality of users 106 may be associated with a dedicated user device. In an alternate embodiment, two or more users amongst the plurality of users 106 may be associated with a single user device.

The proposed processing unit 102 and method may be implemented in such an environment that renders the content to the plurality of users 106. The content may be rendered to the user devices of the plurality of users 106. The processing unit 102 may be configured to enable monitoring of viewing parameters of the plurality of users 106. In an embodiment, the processing unit 102 may be communicatively coupled with the user devices of the plurality of users 106. The processing unit 102 may communicate with user device associated with the user to monitor the viewing parameters. In an embodiment, the processing unit 102 may be implemented as a cloud-based server that is configured to communicate with each of the user devices, for monitoring the viewing parameters. In an alternate embodiment, the processing unit 102 may be part of a user device associated with at least one of the plurality of users 106. In such embodiment, the processing unit 102 may be configured to communicate with the user devices of each of the plurality of users 106 and may be configured to monitor the viewing parameters of the plurality of users 106.

Further, the processing unit 102 may be in communication with each of the sensors 108 and the selection data extraction unit 110. In an embodiment, the sensors may be embedded with the user device associated with the plurality of users 106. The sensors may be configured to log data related to the plurality of users 106. Such data may include but is not limited to, location data, gaze data, field of view data, and movement data of the plurality of participants. The sensors 108 may be sensing devices which may be attached to or embedded with the user device to sense the data of a user associated with the user device. In an embodiment, the sensor 108 may be a camera to track or detect gaze direction, eyeball movement, face movement, head movement and so on. Thus, the gaze data and the movement data may be retrieved from such sensor. Further, another camera may be configured to monitor field of view of the user. Thus, the field of view data may be retrieved from such sensor. In an embodiment, the sensors 108 may be one or more applications associated with the immersive environment. Such sensors may be configured to track actions of the user within the immersive environment, by monitoring display of the user. For example, when the user is walking around a virtual environment, user's prompts or inputs, which aid in user's movement within the virtual environment, may be monitored and retrieved as the location data. One or more other sensing devices or applications, known to a person skilled in the art, may be embedded or coupled with the processing unit 102, to retrieve required inputs for enabling the monitoring of the viewing parameters. The selection data extraction unit 110 may be configured to obtain the selection data from the user. The selection data may indicate the user's selection of participants and corresponding viewing parameters.

In an embodiment, the processing unit 102 may be connected with the user devices associated with the plurality of users 106, the sensors 108, and the selection data extraction unit 110 via the communication network 104. The communication network 104 may include, without limitation, a direct interconnection, a Local Area Network (LAN), a Wide Area Network (WAN), a wireless network (e.g., using Wireless Application Protocol), the Internet, and the like. In an alternate embodiment, the processing unit 102 may be connected with each of said user devices, the sensors 108, and the selection data extraction unit 110 via a corresponding dedicated communication network (not shown in FIGS.).

Figure 2:
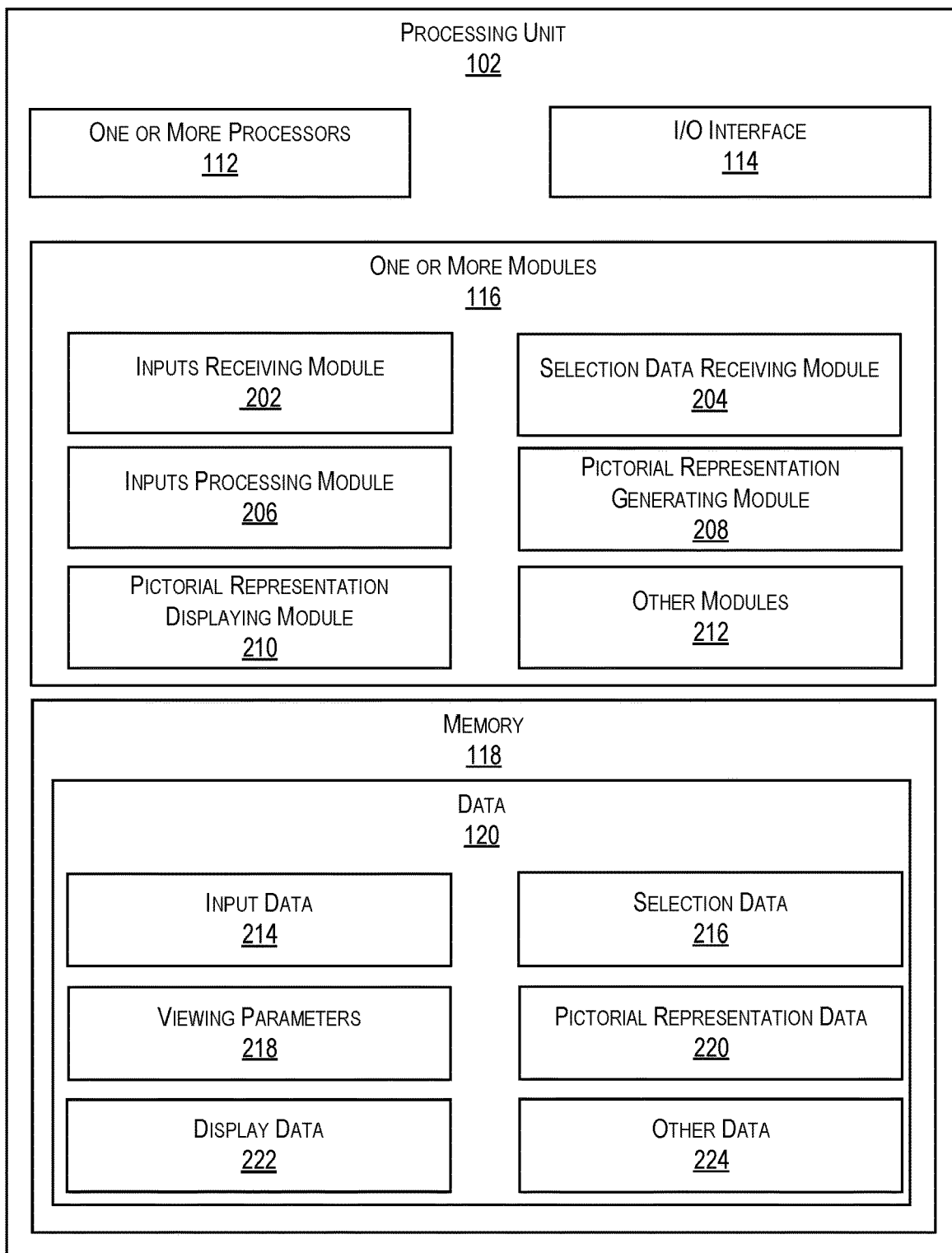
FIG. 2 illustrates a detailed block diagram showing functional modules of a processing unit for monitoring viewing parameters of users in an immersive environment, in accordance with an embodiment of the present invention.

In an embodiment, for monitoring the viewing parameters, the processing unit 102 may be configured to function in real-time, when the content is rendered and viewed by the plurality of users 106. FIG. 2 shows a detailed block diagram of the processing unit 102 for rendering the modified scene to the user, in accordance with some non-limiting embodiments or aspects of the present disclosure. The processing unit 102 may include one or more processors 112, an Input/Output (I/O) interface 114, one or more modules 116, and a memory 118. In some non-limiting embodiments or aspects, the memory 118 may be communicatively coupled to the one or more processors 112. The memory 118 stores instructions, executable by the one or more processors 112, which on execution, may cause the processing unit 102 to monitor the viewing parameters of the users. In some non-limiting embodiments or aspects, the memory 118 may include data 120. The one or more modules 116 may be configured to perform the steps of the present disclosure using the data 120 to monitor the viewing parameters of the users. In some non-limiting embodiments or aspects, each of the one or more modules 116 may be a hardware unit, which may be outside the memory 118 and coupled with the processing unit 102. In some non-limiting embodiments or aspects, the processing unit 102 may be implemented in a variety of computing systems, such as a laptop computer, a desktop computer, a Personal Computer (PC), a notebook, a smartphone, a tablet, e-book readers, a server, a network server, a cloud server, and the like. In a non-limiting embodiment, each of the one or more modules 116 may be implemented with a cloud-based server, communicatively coupled with the processing unit 102.

The data 120 in the memory 118 and the one or more modules 116 of the processing unit 102 are described herein in detail. In one implementation, the one or more modules 116 may include but is not limited to, an inputs receiving module 202, a selection data receiving module 204, an inputs processing module 206, a pictorial representation generating module 208, a pictorial representation displaying module 210 and one or more other modules 212 associated with the processing unit 102. In some non-limiting embodiments or aspects, the data 120 in the memory 118 may include input data 214 (herewith also referred to as one or more real-time inputs 214), selection data 216, viewing parameters 218 (herewith also referred to as plurality of viewing parameters 218), pictorial representation data 220, display data 222 and other data 224 associated with the processing unit 102.

In some non-limiting embodiments or aspects, the data 120 in the memory 118 may be processed by the one or more modules 116 of the processing unit 102. In some non-limiting embodiments or aspects, the one or more modules 116 may be implemented as dedicated units and when implemented in such a manner, the modules may be configured with the functionality defined in the present disclosure to result in novel hardware. As used herein, the term module may refer to an Application Specific Integrated Circuit (ASIC), an electronic circuit, Field-Programmable Gate Arrays (FPGA), a Programmable System-on-Chip (PSoC), a combinational logic circuit, and/or other suitable components that provide the described functionality. The one or more modules 116 of the present disclosure enables monitoring of the viewing parameters 218 of the users. The one or more modules 116 along with the data 120, may be implemented in any system for monitoring the viewing parameters 218 of the users in the immersive environment.

In the immersive environment with multiple participants, there may be a need to track viewing direction, current field of view, interaction status, and relative location of a participant amongst the multiple participants. Based on such monitoring, one or more actions may be triggered by a user who is monitoring the participant. One or more actions may include, but is not limited to, altering the participant when a deviation is detected in the viewing angle, customizing interaction with the participant within the immersive environment, making modification to the rendered content, and so on. For example, consider an immersive gaming environment with multiple players, there may be a need to monitor the location of the players within the virtual gaming space, or there may be a need to track the movement of the players within the virtual gaming space. Consider another example where the immersive environment is a virtual classroom environment with multiple students and a professor/lecturer. In such cases, there may be a need for the professor to monitor the students to concentration on the content presented by the professor. By monitoring the viewing parameters, the professor may send alerts or may initiate an interaction with the students.

Thus, the present invention teaches to provision an option to a user to monitor the viewing parameters for desired participants. Consider an exemplary immersive environment illustrated in FIG. 3A. The immersive environment includes a virtual tour of a real estate property to plurality of users 106. In an embodiment, the plurality of users 106 may include an agent as the presenter and one or more customers as the one or more attendees. The scenes may include but are not limited to, view of kitchen, view of living room, view from a balcony, view inside a bedroom and so on. The one or more attendees may virtually walk through the real-estate property to view multiple perspectives of the real-estate property. The one or more attendees may be able to virtually walk around the real-estate property and view assets and space of the real-estate property. There may be a need for the agent to monitor the viewing parameters of the plurality of users 106. In an embodiment, based on the monitoring, the agent may initiate an interaction with a customer. In another embodiment, based on the monitoring, the agent may customize and alter the placement of additional objects within the immersive environment. In an embodiment, based on the monitoring, the agent may direct and guide the customer within the immersive environment.

For enabling the monitoring, the inputs receiving module 202 may be configured to receive the one or more real-time inputs 214 from the sensors 108. The sensors may be associated with each of plurality of participants in the immersive environment. In an embodiment, the sensors 108 may be embedded with the user devices related to the plurality of participants. The sensors 108 may be configured to log data related to the plurality of users 106. Such data may include but is not limited to, location data, gaze data, field of view data, and movement data of the plurality of participants. Said data may be received for each of the plurality of participants and stored in a database associated with the processing unit 102. During the monitoring of the viewing parameters, the data may be retrieved from the database and processed for outputting the viewing parameters. In an alternate embodiment, the data from the sensors may be received when the user initiates the monitoring of the viewing parameters in the immersive embodiment. The location data may indicate current location of a participant amongst the plurality of the participants in the immersive environment. The location data may be a virtual location of the participant within pre-defined virtual space of the immersive environment. The location data may be received by tracking path of the participant within the pre-defined virtual space. The gaze data may indicate gazing direction of a participant within the immersive environment. In an embodiment, eyeball movement or head movement of the participant may be tracked to receive the graze data. The field of view data may indicate the current field of view of the participant. The scene and objects viewed by the participant within the immersive environment may be represented as the field of view data. The movement data may represent a virtual movement of the participant within the predefined virtual space of the immersive environment.

Further, the selection data receiving module 204 may be configured to receive the selection data 216 from a user. In an embodiment, the user may intend to monitor one or more viewing parameters amongst the viewing parameters of one or more participants amongst the plurality of participants. In an embodiment, the user may select the one or more participants. The selection data 216 may indicate one or more selected participants amongst the plurality of participants and at least one selected viewing parameter amongst plurality of viewing parameters 218 of the plurality of participants. In an embodiment, the user may be prompted to dynamically input the selection data 216 using one or more options. In an embodiment, the options may list the plurality of participants and corresponding viewing parameters. With a variation in the plurality of participants within the immersive environment, the options provided to the user may also change. The participants and the viewing parameters selected by the user may be saved as the selection data 216 in the memory 118.

Upon receiving the selection data 216, the inputs processing module 206 may be configured to process the one or more inputs. The one or more inputs may be processed to output the plurality of viewing parameters 218 of the one or more selected participants. In an embodiment, image processing techniques may be implemented to process the one or more inputs. In an embodiment, the processing may include retrieving the one or more inputs as raw data and converting the raw data to represent viewing parameters. The plurality of viewing parameters 218 comprises at least one of the viewing angle, the viewing range, the viewing angle deviation, the current field of view, the relative location, and the interaction status of the one or more selected participants. One or more other viewing parameters, known to a person skilled in the art, may be outputted, based on the immersive environment and requirements of the user. In an embodiment, the viewing angle may include focal angle or angle of view of a selected participant. The viewing angle may be associated with the current field of view of the selected participant. In an embodiment, the viewing range may indicate range of view of the selected participant. At an instant of time, the viewing range may indicate access provided to the selected participant to view the surroundings of the current field of view. Further, the viewing range is always greater than the viewing angle. In an embodiment, the viewing angle deviation may indicate deviation of the viewing angle of each of the one or more selected participants from a predefined viewing angle set by the user. The predefined viewing angle may be dynamically provided by the user when selecting the viewing angle deviation as the viewing parameters for the selected participant. In an embodiment, the relative location represents proximity between the one or more selected participants and the user, and amongst the one or more selected participants. In an embodiment, the interaction status may represent an indication of at least two participants amongst the one or more selected participants interacting with each other. In an embodiment, the interaction status may represent an indication of at least one of the one or more selected participants interacting with the user. In an embodiment, the interaction status may represent an indication of at least one of the one or more selected participants interacting with participant amongst the plurality of participants other than the one or more selected participants.

Upon generating the plurality of viewing parameters 218, the pictorial representation generating module 208 may be configured to generate a first set of pictorial representations. The first set of pictorial representations represents the one or more selected participants and corresponding selected viewing parameters. In an embodiment, the pictorial representation generating module 208 may be further configured to generate a second set of pictorial representations. The second set of pictorial representations may be related to additional objects displayed within the immersive environment. In an embodiment, the additional objects may be related to commerce, engagement, advertisement, brand activation, and so on. In an embodiment, the user may be configured to select objects from the additional objects to output one or more selected objects. Information related to the one or more selected objects may be saved in the memory 118 as the selection data 216. In an embodiment, the second set of pictorial representations may be related to the one or more selected objects. The one or more other modules 212 may include a module that is configured to track placement of the one or more selected objects present in the immersive environment. Further, the pictorial representation generating module 208 may be configured to generate the second set of pictorial representations. In a non-limiting embodiment, the one or more data visualization techniques, known to a person skilled in the art, may be implemented to generate the first set of pictorial representations and the second set of pictorial representations.

The pictorial representation displaying module 210 may be configured to display at least one of the first set of pictorial representations and the second set of pictorial representations in a predefined space. The information to be displayed within the predefined region may be stored as the display data 222. The predefined space may be within current field of view of the user. The predefined space may represent the virtual space of the immersive environment. By viewing the predefined space with the pictorial representation data 220, the user may be enabled to monitor the viewing parameters 218 of the participants. In an embodiment, the second set of pictorial representations may be displayed within the predefined space, relative to the at least one selected viewing parameters of the one or more selected participants. The display of the second set of pictorial representations may vary dynamically based on the viewing parameters of the one or more participants.

Figure 3A:
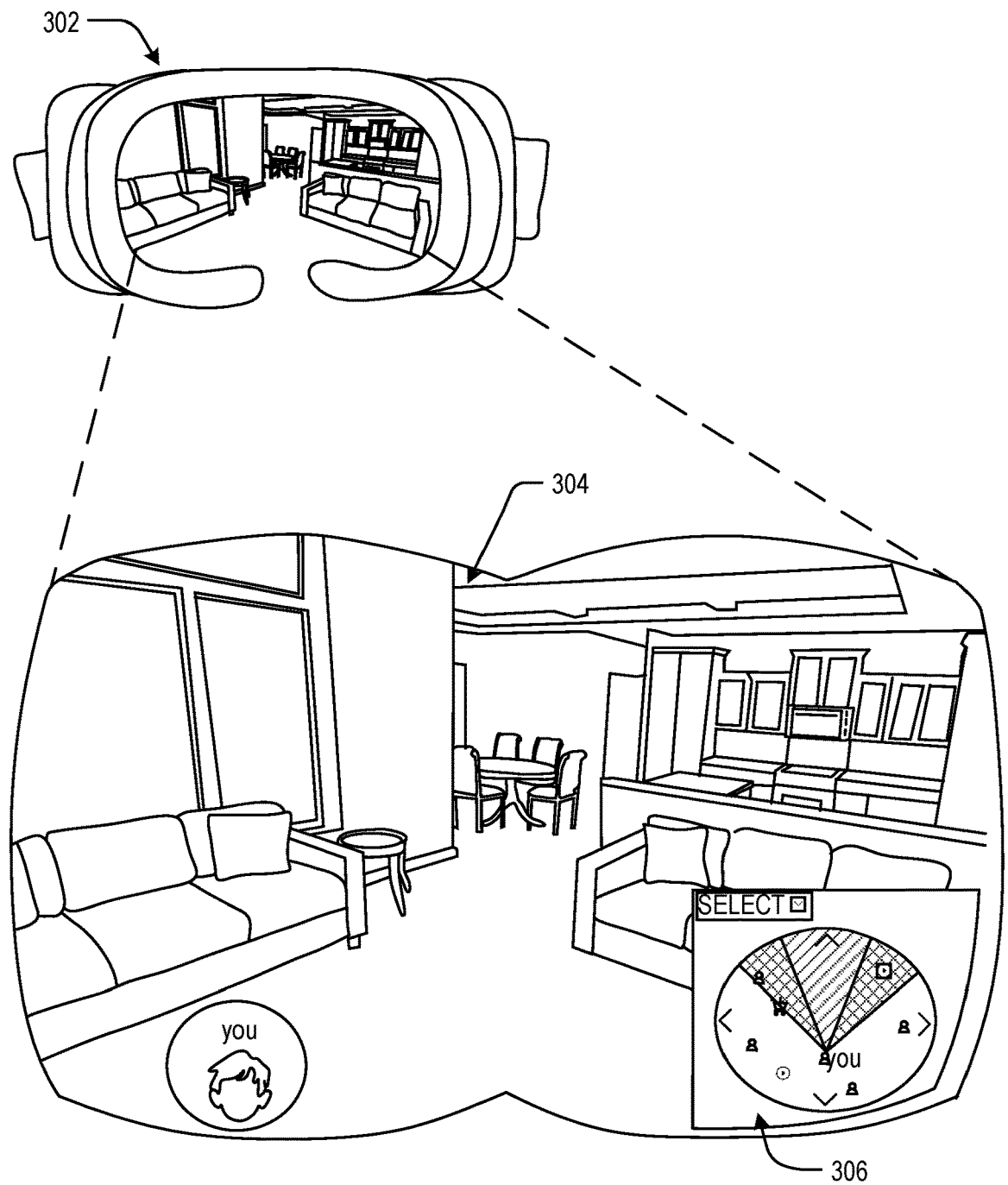
FIGS. 3A-3H show exemplary embodiments for monitoring viewing parameters of users in an immersive environment, in accordance with an embodiment of the present invention.
Figure 3B:
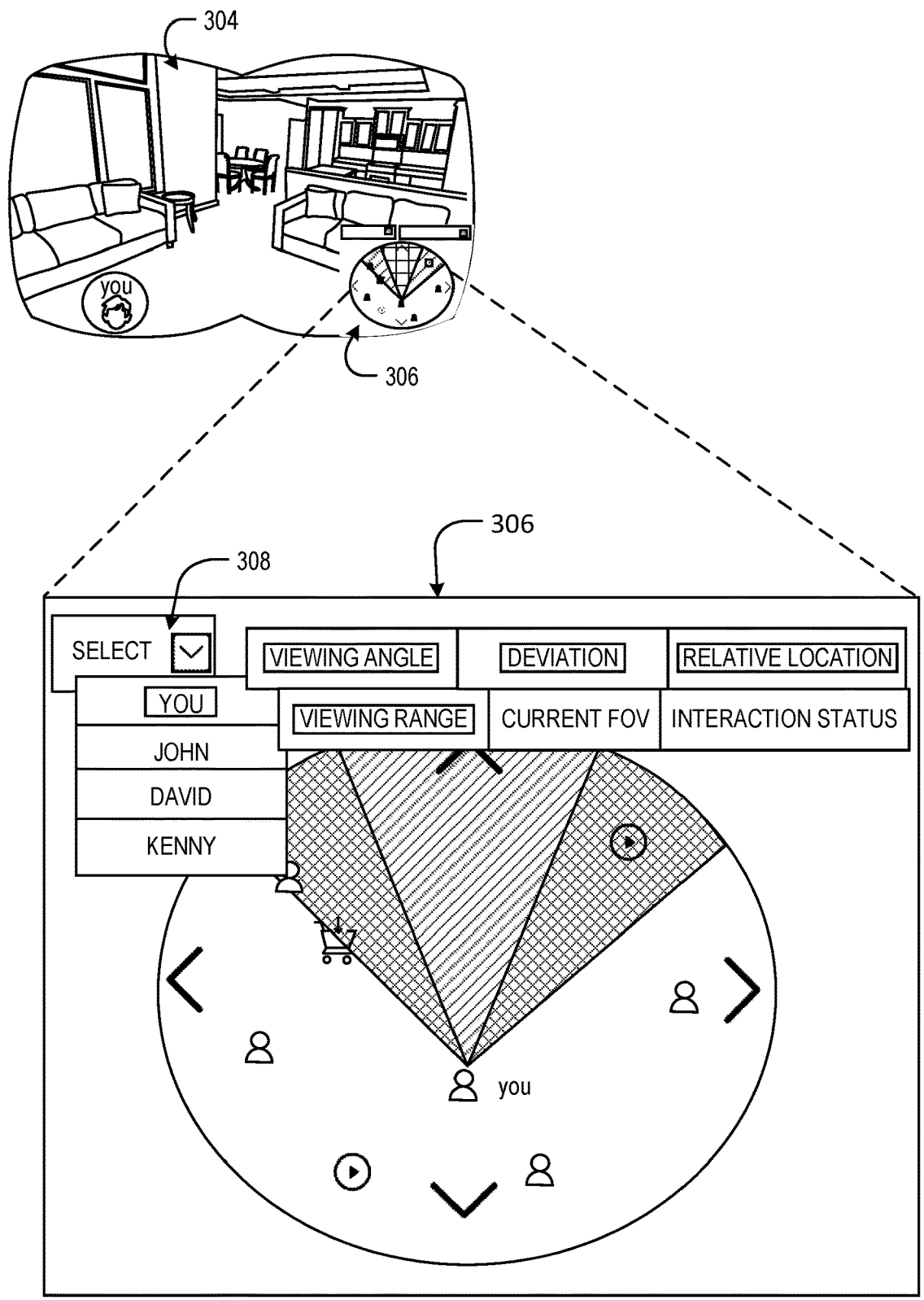
Figure 3C:
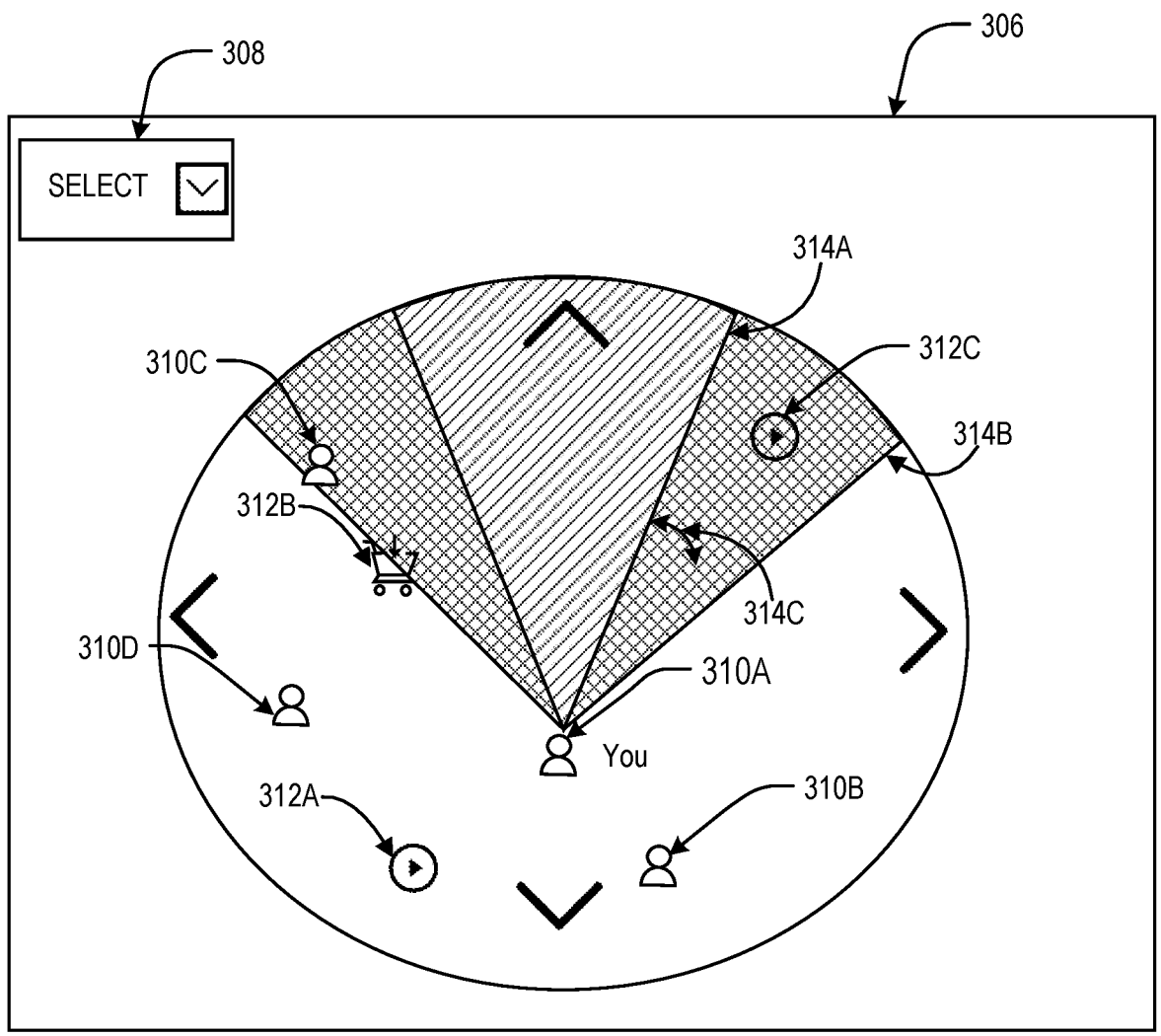

An exemplary representation of displaying of the pictorial representation data is shown in FIG. 3A. The pictorial representation data 220 may be displayed within a predefined region 306. FIG. 3B shows an exemplary representation of the predefined region 306 with the pictorial representation data 220. The user may be prompted with an option 308 to select participants and corresponding viewing parameters. In an embodiment, the user may select himself and his viewing parameters to view in the predefined region 306. In the example shown in FIG. 3B, the user selects the viewing parameters as viewing angle, deviation, relative location, and viewing range. An exemplary indication of the pictorial representation data 220 generated for the user is shown in FIG. 3C. Consider the pictorial representation of the one or more selected participants is shown as 310A, 310B, 310C, and 310D. The user is represented as pictorial representation 310A. The pictorial representation of the selected viewing parameters is shown as 314A, 314B, and 314C. The pictorial representation of the one or more selected objects is shown as 312A, 312B, and 312C. The relative location may be indicated by placing the pictorial representations 310A, 310B, 310C, and 310D of the one or more selected participants within the predefined space. The viewing angle of the user is shown as viewing parameter 314A. The viewing range of the user is shown as viewing parameter 314B. The viewing deviation of the user is shown as viewing parameter 314C.

Figure 3D:
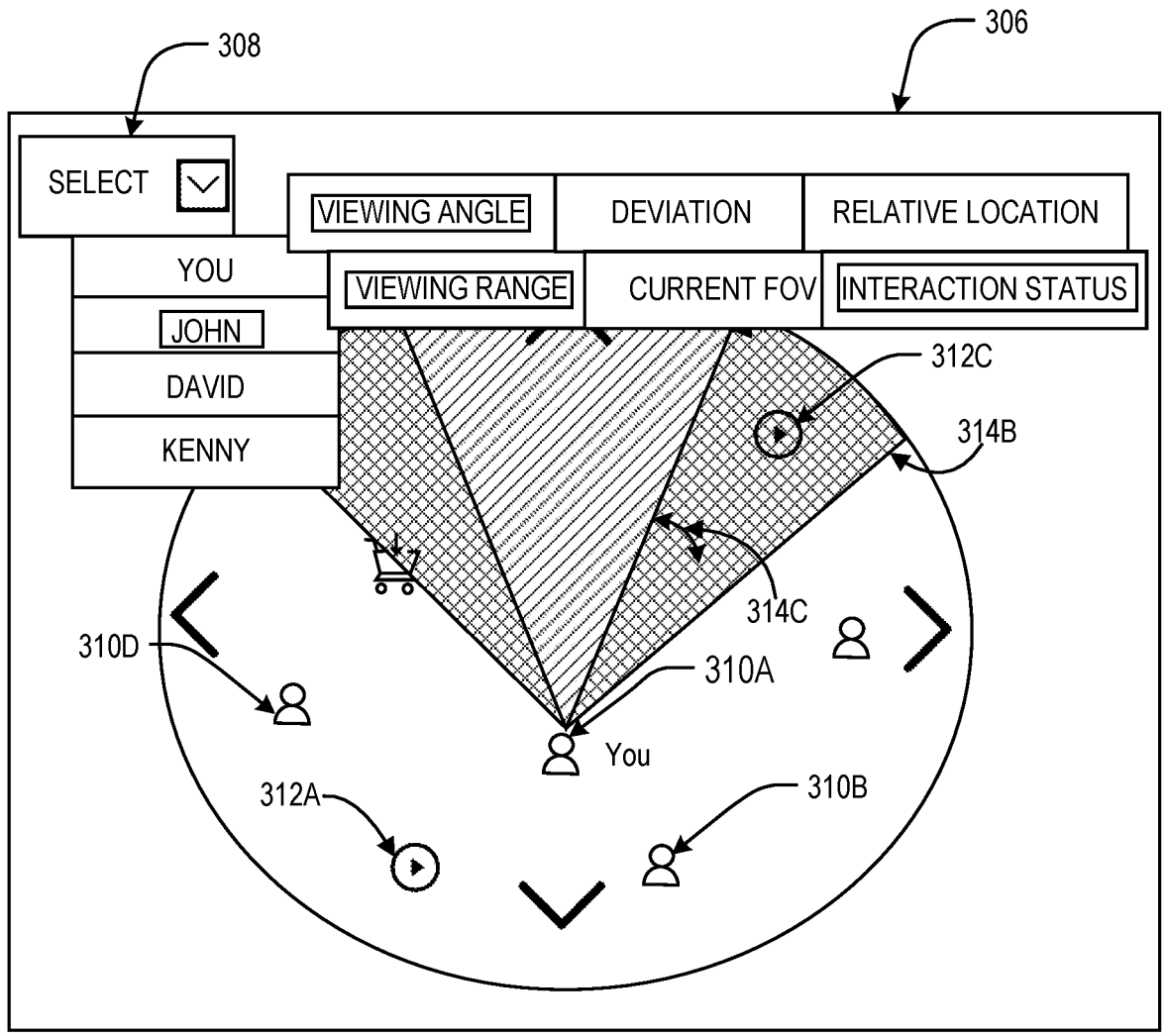
Figure 3E:
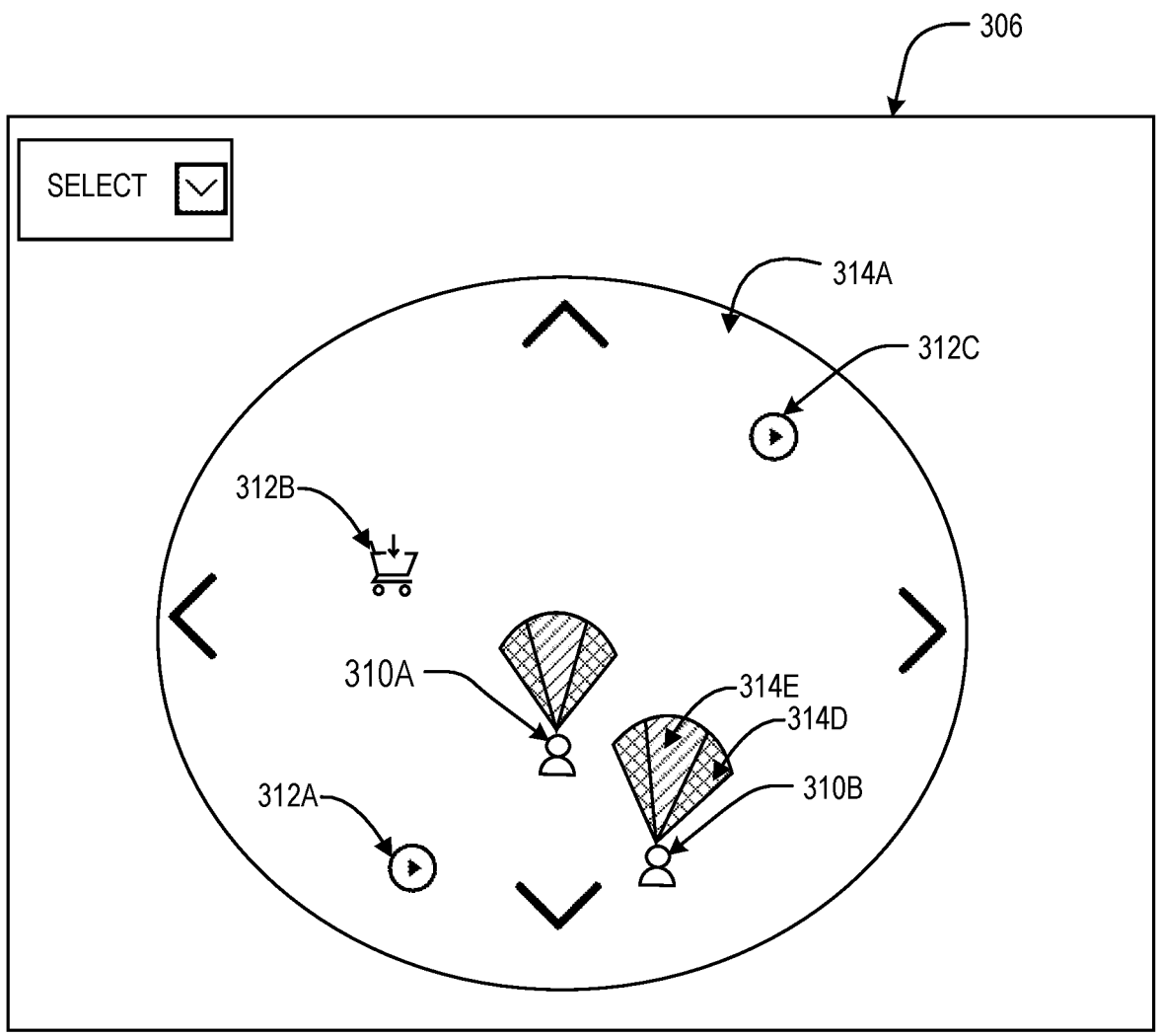
Figure 3F:
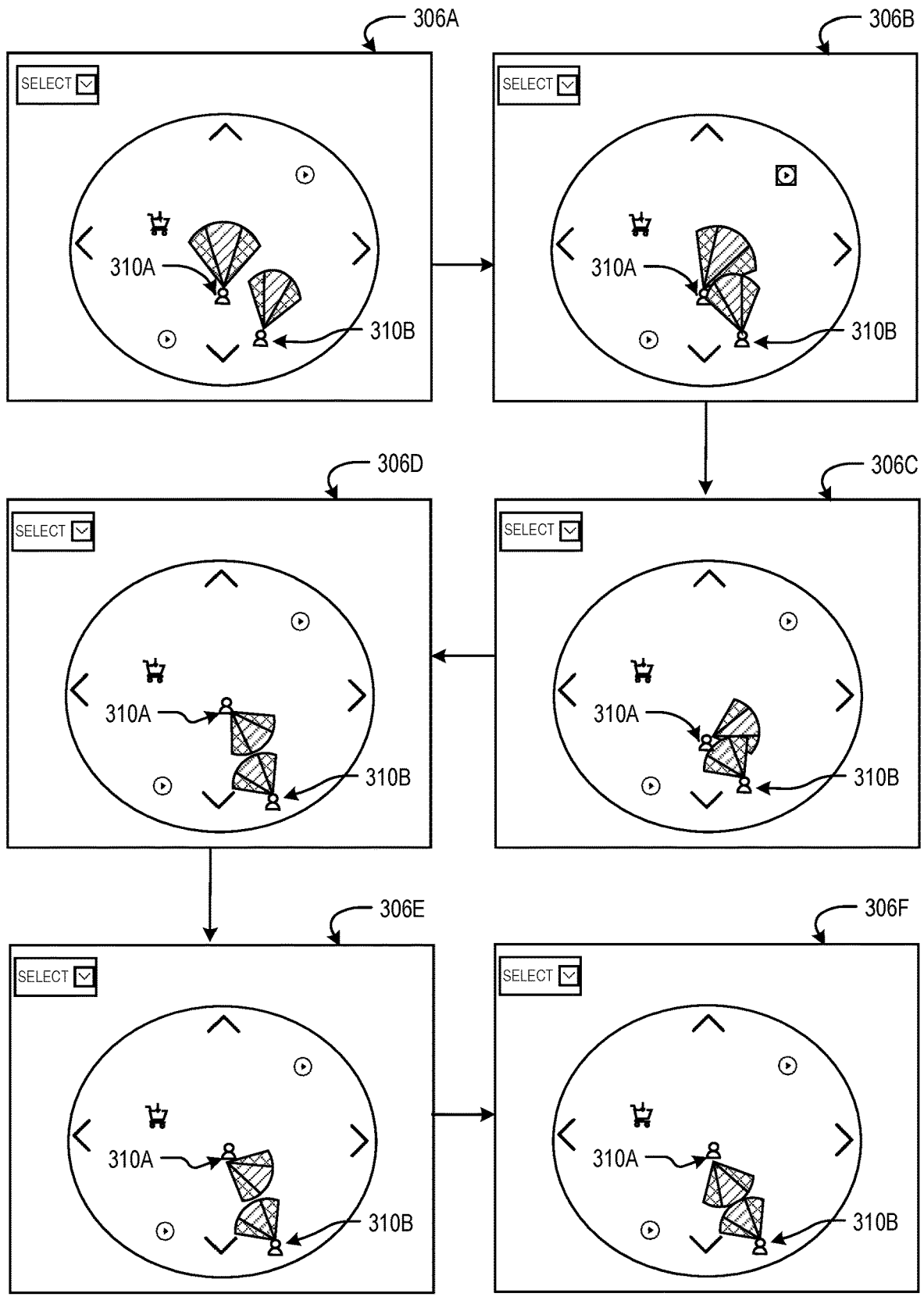

With the option 308, the user may be prompted to monitor viewing parameters of other participants. Consider the predefined region shown in FIG. 3D. The user selects other participant as "JOHN" and the one or more viewing parameters to be "VIEWING ANGLE, VIEWING RANGE", "INTERACTION STATUS", as shown in the FIG. 3D. The pictorial representation may be generated and displayed to be as shown in FIG. 3E. Attendee "JOHN" is represented as pictorial representation 310B. The viewing angle of the attendee "JOHN" is shown as viewing parameter 314E. The viewing range of the attendee "JOHN" is shown as viewing parameter 314B. The interaction status of the attendee "JOHN" may be inferred from the direction of the gaze. For example, consider pictorial representations shown in FIG. 3F. With the change in the viewing parameters, the pictorial representation data 220 also changes to display accurate viewing parameters. The changing viewing parameters are shown sequentially with predefined regions 306A, 306B, 306C, 306D, 306E, and 306F, which are displayed in multiple instances. When the direction of gaze of two attendees is opposite to each other, it may be inferred that the two attendees are communicating with each other.

Figure 3G:
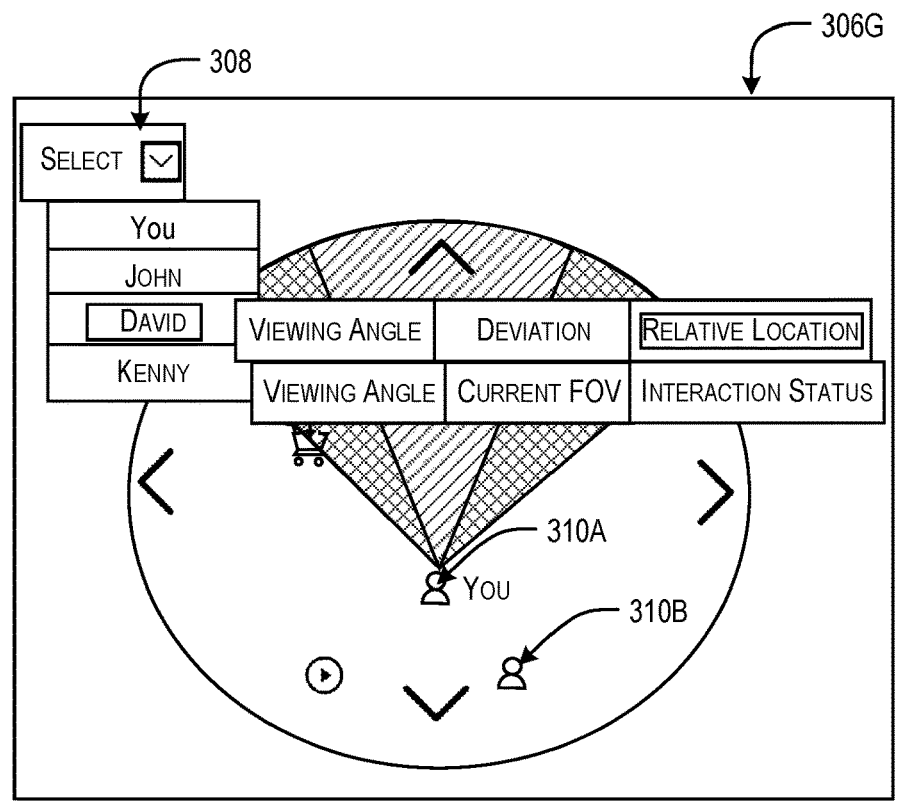
Figure 3G:
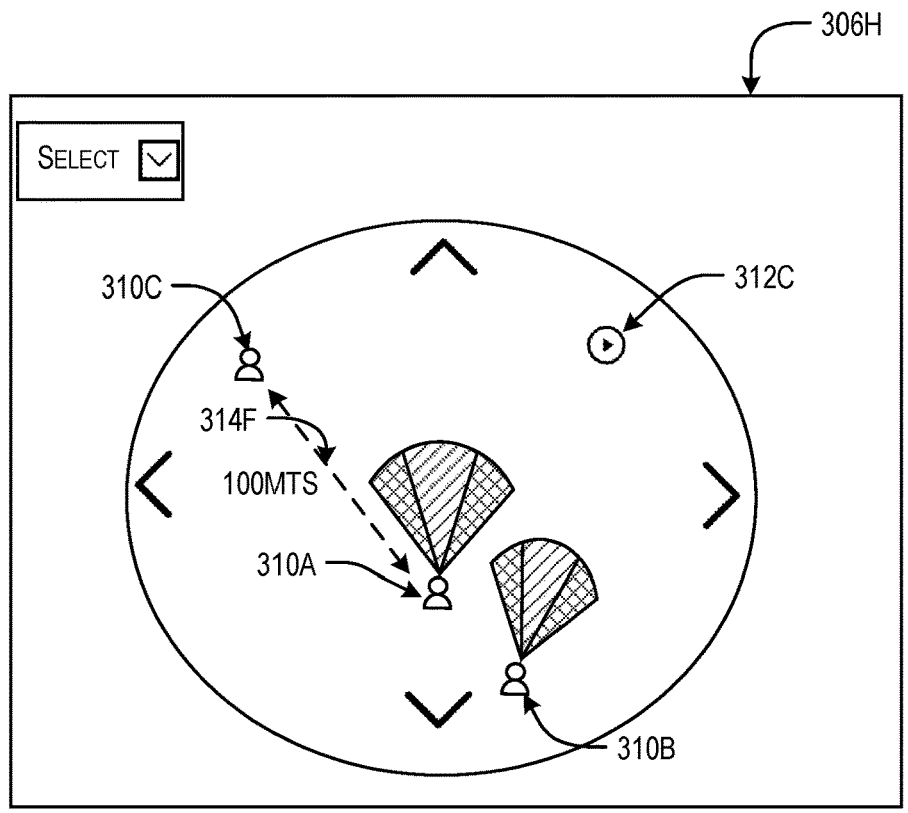

Further, consider with the option 308, the user selects another participant as "DAVID" and the one or more viewing parameters to be "RELATIVE LOCATION", as shown in predefined region 306G in FIG. 3G. The pictorial representation may be generated and displayed as shown in predefined region 306H in FIG. 3G. Attendee "DAVID" is represented as pictorial representation 310B. In an embodiment, the relative location may indicate proximity between the selected participant and the user as shown in viewing parameter 314F.

Figure 3H:
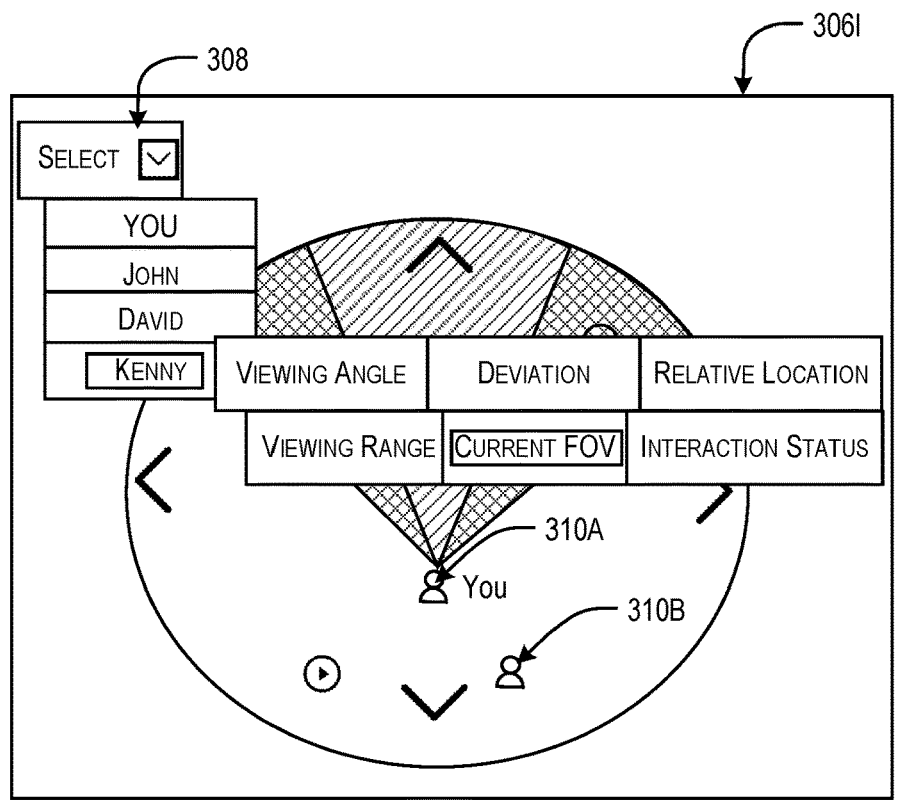
Figure 3H:
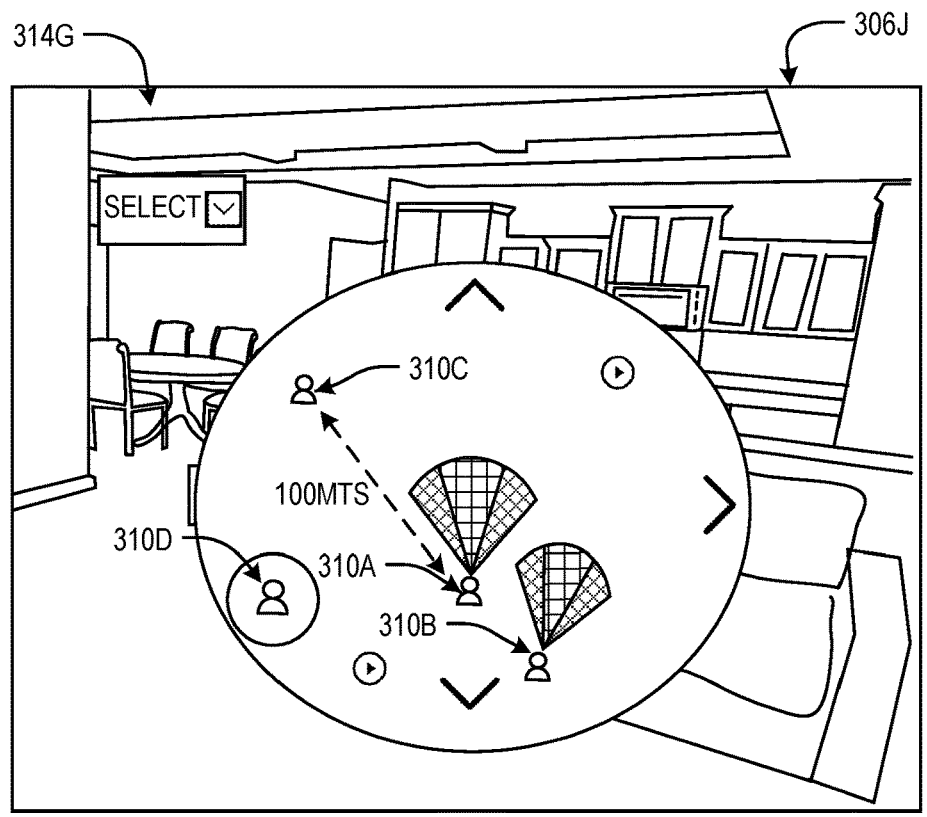

Consider with the option 308, the user selects another participant as "KENNY" and the one or more viewing parameters to be "CURRENT FOV", as shown in predefined region 306I in FIG. 3H. The pictorial representation may be generated and displayed as shown in predefined region 306J in FIG. 3H. In an embodiment, current field of view 314G of the selected participant may be displayed within the predefined region as shown in predefined region 306J. In an embodiment, the current field of view of the user may be changed to the current field of view of the selected participant. In such case, the current field of view of the selected participant may be displayed for a predefined duration of time or until further instruction is received from the user.

In some non-limiting embodiments or aspects, the processing unit 102 may receive data for monitoring the viewing parameters via the I/O interface 114. The received data may include but is not limited to, at least one of the input data 214, the selection data 216, and the like. Also, the processing unit 102 may transmit data for monitoring the viewing parameters via the I/O interface 114. The transmitted data may include but is not limited to, the viewing parameters 218, the pictorial representation data 220, the display data 222, and the like.

The other data 224 may comprise data, including temporary data and temporary files, generated by modules for performing the various functions of the processing unit 102. The one or more modules 116 may also include other modules 212 to perform various miscellaneous functionalities of the processing unit 102. It would be appreciated that such modules may be represented as a single module or a combination of different modules.

Some non-limiting embodiments or aspects of the present disclosure focus on generating and monitoring the viewing parameters based on the selection data. Thus, not all the one or more real-time inputs 214 are processed to generate the viewing parameters. However, the one or more real-time inputs 214 related to the selected participants and the selected viewing parameters shall only be processed to generate the viewing parameters.

Some non-limiting embodiments or aspects of the present disclosure teach to dynamically generate and display the pictorial representation of the viewing parameters. Dynamic display of the viewing parameters enables the user to monitor effectively. Real-time changes in the viewing parameters of the selected participants may be tracked dynamically.

Some non-limiting embodiments or aspects of the present disclosure provide an option for the user to select participants and viewing parameters that are intended to be monitored. Thus, in cases where there are multiple participants, the pictorial representation may not be cluttered and is modified based on the requirement of the user.

Figure 4:
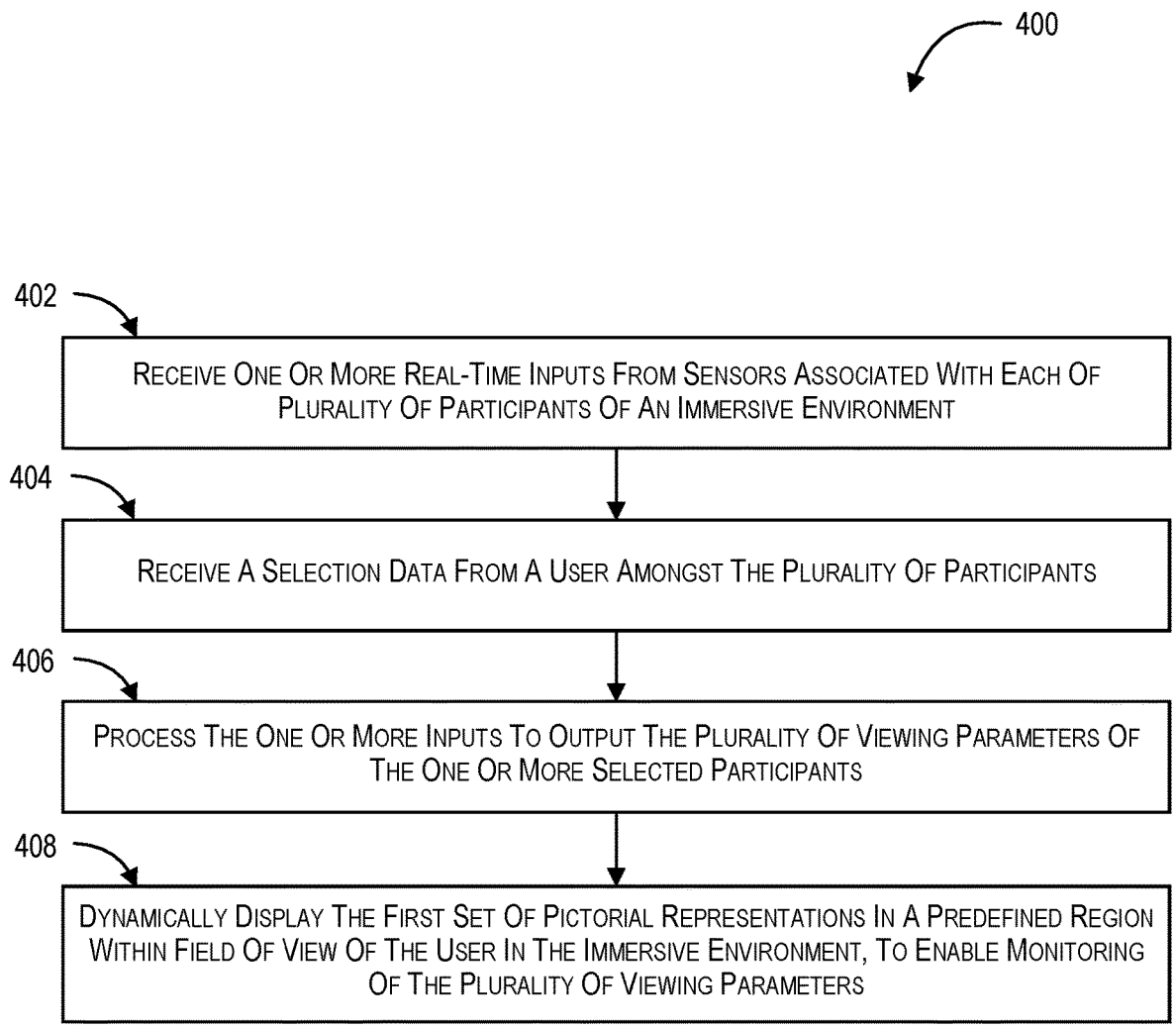
FIG. 4 is an exemplary process of processing unit for monitoring viewing parameters of users in an immersive environment, in accordance with an embodiment of the present invention.

FIG. 4 shows an exemplary process of a processing unit 102 for monitoring viewing parameters of users in an immersive environment, in accordance with an embodiment of the present disclosure. Process 400 for monitoring the viewing parameters includes steps coded in form of executable instructions to be executed by a processing unit associated with the immersive environment with the at least one presenter and the one or more attendees.

At block 402, the processing unit may be configured to receive the one or more real-time inputs from sensors associated with each of plurality of participants in an immersive environment. The one or more real-time inputs represent at least one of location data, gaze data, field of view data, and movement data of the plurality of participants.

At block 404, the processing unit may be configured to receive a selection data from a user amongst the plurality of participants. The selection data indicates one or more selected participants amongst the plurality of participants and at least one selected viewing parameter amongst plurality of viewing parameters of the plurality of participants. In an embodiment, the processing unit may be configured to prompt the user to dynamically input the selection data using one or more options in the predefined region.

At block 406, the processing unit may be configured to process the one or more inputs to output the plurality of viewing parameters of the one or more selected participants. The plurality of viewing parameters comprises at least one viewing angle, viewing range, viewing angle deviation, current field of view, relative location, and interaction status of the one or more selected participants. In an embodiment, the viewing angle deviation indicates deviation of the viewing angle of each of the one or more selected participants from a predefined viewing angle set by the user. In an embodiment, the relative location represents proximity between the one or more selected participants and the user, and amongst the one or more selected participants. In an embodiment, the interaction status comprises, at least one indication of at least two participants amongst the one or more selected participants interacting with each other, indication of at least one of the one or more selected participants interacting with the user, and indication of at least one of the one or more selected participants interacting with participant amongst the plurality of participants other than the one or more selected participants.

At block 408, the processing unit may be configured to generate first set of pictorial representations to represent the one or more selected participants and corresponding selected viewing parameters, for the user.

At block 410, the processing unit may be configured to dynamically display the first set of pictorial representations in a predefined region within field of view of the user in the immersive environment, to enable monitoring of the plurality of viewing parameters. In an embodiment, the processing unit may be further configured to display a second set of pictorial representations in the predefined space relative to the at least one selected viewing parameters of the one or more selected participants. The second set of pictorial representations are representation of one or more selected objects present in the immersive environment. The second set of pictorial representations is displayed within the predefined region based on placement of the one or more selected objects tracked within the immersive environment. As illustrated in FIG. 4, the method 400 may include one or more steps for executing processes in the processing unit 102. The method 400 may be described in the general context of computer-executable instructions. Generally, computer-executable instructions can include routines, programs, objects, components, data structures, procedures, modules, and functions, which perform particular functions or implement particular abstract data types.

The order in which steps in method 400 are described may not intended to be construed as a limitation, and any number of the described method steps can be combined in any order to implement the method. Additionally, individual steps may be deleted from the methods without departing from the scope of the subject matter described herein. Furthermore, the method can be implemented in any suitable hardware, software, firmware, or combination thereof.

Figure 5:
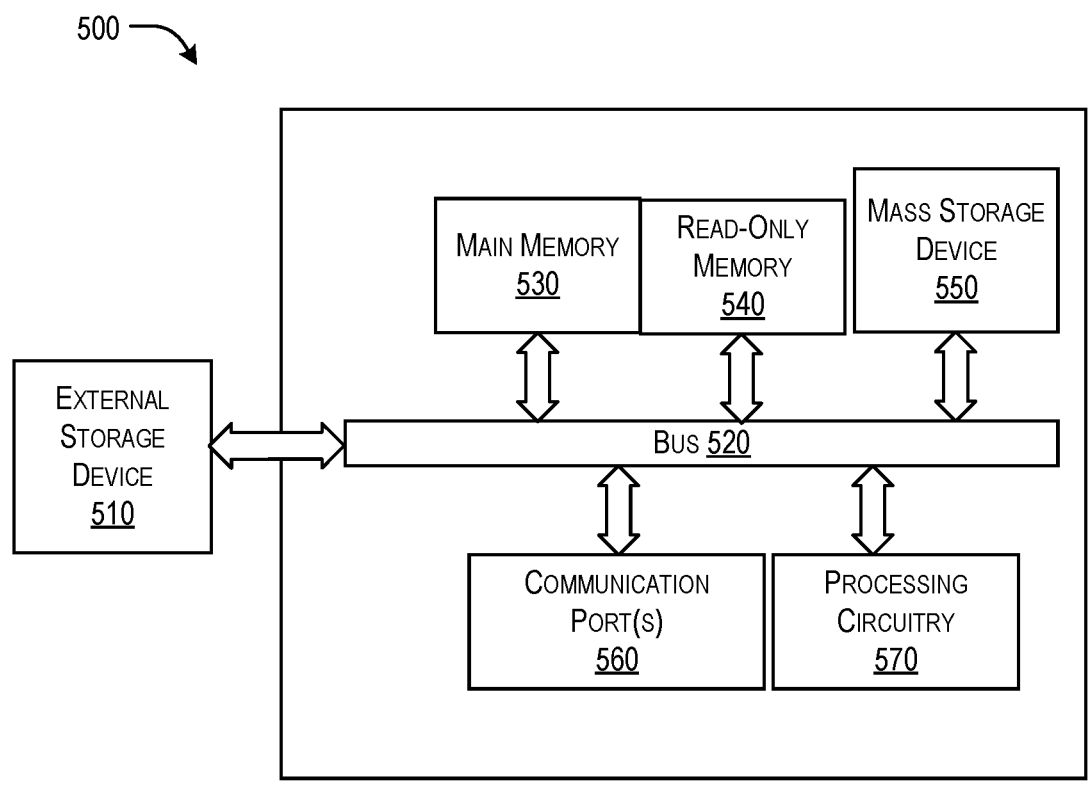
FIG. 5 illustrates an exemplary computer unit in which or with which embodiments of the present invention may be utilized.

FIG. 5 illustrates an exemplary computer system in which or with which embodiments of the present invention may be utilized. Depending upon the particular implementation, the various process and decision blocks described above may be performed by hardware components, embodied in machine-executable instructions, which may be used to cause a general-purpose or special-purpose processor programmed with the instructions to perform the steps or the steps may be performed by a combination of hardware, software and/or firmware. As shown in FIG. 5, the computer system 500 includes an external storage device 510, bus 520, main memory 530, read-only memory 540, mass storage device 550, communication port(s) 560, and processing circuitry 570.

Those skilled in the art will appreciate that the computer system 500 may include more than one processing circuitry 570 and one or more communication ports 560. The processing circuitry 570 should be understood to mean circuitry based on one or more microprocessors, microcontrollers, digital signal processors, programmable logic devices, Field-Programmable Gate Arrays (FPGAs), Application-Specific Integrated Circuits (ASICs), etc., and may include a multi-core processor (e.g., dual-core, quadcore, Hexa-core, or any suitable number of cores) or supercomputer. In some embodiments, the processing circuitry 570 is distributed across multiple separate processors or processing units, for example, multiple of the same type of processing units (e.g., two Intel Core i7 processors) or multiple different processors (e.g., an Intel Core i5 processor and an Intel Core i7 processor). Examples of the processing circuitry 570 include but are not limited to, an Intel® Itanium® or Itanium 2 processor(s), AMD® Opteron® or Athlon MP® processor(s), Motorola® lines of processors, System on Chip (SoC) processors or other future processors. The processing circuitry 570 may include various modules associated with embodiments of the present disclosure.

The communication port 560 may include a cable modem, Integrated Services Digital Network (ISDN) modem, a Digital Subscriber Line (DSL) modem, a telephone modem, an Ethernet card, or a wireless modem for communications with other equipment, or any other suitable communications circuitry. Such communications may involve the Internet or any other suitable communications networks or paths. In addition, communications circuitry may include circuitry that enables peer-to-peer communication of electronic devices or communication of electronic devices in locations remote from each other. The communication port 560 may be any RS-232 port for use with a modem-based dialup connection, a 10/100 Ethernet port, a Gigabit, or a 10 Gigabit port using copper or fiber, a serial port, a parallel port, or other existing or future ports. The communication port 560 may be chosen depending on a network, such as a Local Area Network (LAN), Wide Area Network (WAN), or any network to which the computer system 500 may be connected.

The main memory 530 may include Random Access Memory (RAM) or any other dynamic storage device commonly known in the art. Read-only memory (ROM) 540 may be any static storage device(s), e.g., but not limited to, a Programmable Read-Only Memory (PROM) chips for storing static information, e.g., start-up or BIOS instructions for the processing circuitry 570.

The mass storage device 550 may be an electronic storage device. As referred to herein, the phrase "electronic storage device" or "storage device" should be understood to mean any device for storing electronic data, computer software, or firmware, such as random-access memory, read-only memory, hard drives, optical drives, Digital Video Disc (DVD) recorders, Compact Disc (CD) recorders, BLU-RAY disc (BD) recorders, BLU-RAY 3D disc recorders, Digital Video Recorders (DVRs, sometimes called a personal video recorder or PVRs), solid-state devices, quantum storage devices, gaming consoles, gaming media, or any other suitable fixed or removable storage devices, and/or any combination of the same. Nonvolatile memory may also be used (e.g., to launch a boot-up routine and other instructions). Cloud-based storage may be used to supplement the main memory 530. The mass storage device 550 may be any current or future mass storage solution, which may be used to store information and/or instructions. Exemplary mass storage solutions include, but are not limited to, Parallel Advanced Technology Attachment (PATA) or Serial Advanced Technology Attachment (SATA) hard disk drives or solid-state drives (internal or external, e.g., having Universal Serial Bus (USB) and/or Firmware interfaces), e.g., those available from Seagate (e.g., the Seagate Barracuda 7200 family) or Hitachi (e.g., the Hitachi Deskstar 7K1000), one or more optical discs, Redundant Array of Independent Disks (RAID) storage, e.g., an array of disks (e.g., SATA arrays), available from various vendors including Dot Hill Systems Corp., LaCie, Nexsan Technologies, Inc. and Enhance Technology, Inc.

The bus 520 communicatively couples the processing circuitry 570 with the other memory, storage, and communication blocks. The bus 520 may be, e.g., a Peripheral Component Interconnect (PCI)/PCI Extended (PCI-X) bus, Small Computer System Interface (SCSI), USB, or the like, for connecting expansion cards, drives, and other subsystems as well as other buses, such a front side bus (FSB), which connects processing circuitry 570 to the software system.

Optionally, operator and administrative interfaces, e.g., a display, keyboard, and a cursor control device, may also be coupled to the bus 520 to support direct operator interaction with the computer system 500. Other operator and administrative interfaces may be provided through network connections connected through the communication port(s) 560. The external storage device 510 may be any kind of external hard drives, floppy drives, IOMEGA® Zip Drives, Compact Disc-Read-Only Memory (CD-ROM), Compact Disc-Re-Writable (CD-RW), Digital Video Disk-Read Only Memory (DVD-ROM). The components described above are meant only to exemplify various possibilities. In no way should the aforementioned exemplary computer system limit the scope of the present disclosure.

The computer system 500 may be accessed through a user interface. The user interface application may be implemented using any suitable architecture. For example, it may be a stand-alone application wholly implemented on the computer system 500. The user interfaces application and/or any instructions for performing any of the embodiments discussed herein may be encoded on computer-readable media. Computer-readable media includes any media capable of storing data. In some embodiments, the user interface application is client-server-based. Data for use by a thick or thin client implemented on electronic device computer system 500 is retrieved on-demand by issuing requests to a server remote to the computer system 500. For example, computer system 500 may receive inputs from the user via an input interface and transmit those inputs to the remote server for processing and generating the corresponding outputs. The generated output is then transmitted to the computer system 500 for presentation to the user.

While embodiments of the present invention have been illustrated and described, it will be clear that the invention is not limited to these embodiments only. Numerous modifications, changes, variations, substitutions, and equivalents, will be apparent to those skilled in the art without departing from the spirit and scope of the invention, as described in the claims.

Thus, it will be appreciated by those of ordinary skill in the art that the diagrams, schematics, illustrations, and the like represent conceptual views or processes illustrating systems and methods embodying this invention. The functions of the various elements shown in the figures may be provided through the use of dedicated hardware as well as hardware capable of executing associated software. Similarly, any switches shown in the figures are conceptual only. Their function may be carried out through the operation of program logic, through dedicated logic, through the interaction of program control and dedicated logic, or even manually, the particular technique being selectable by the entity implementing this invention. Those of ordinary skill in the art further understand that the exemplary hardware, software, processes, methods, and/or operating systems described herein are for illustrative purposes and, thus, are not intended to be limited to any particular name.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously. Within the context of this document, terms "coupled to" and "coupled with" are also used euphemistically to mean "communicatively coupled with" over a network, where two or more devices are able to exchange data with each other over the network, possibly via one or more intermediary device.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refer to at least one of something selected from the group consisting of A, B, C . . . and N, the text should be interpreted as requiring only one element from the group, not A plus N, or B plus N, etc.

While the foregoing describes various embodiments of the invention, other and further embodiments of the invention may be devised without departing from the basic scope thereof. The scope of the invention is determined by the claims that follow. The invention is not limited to the described embodiments, versions, or examples, which are included to enable a person having ordinary skill in the art to make and use the invention when combined with information and knowledge available to the person having ordinary skill in the art.

The foregoing description of embodiments is provided to enable any person skilled in the art to make and use the subject matter. Various modifications to these embodiments will be readily apparent to those skilled in the art, and the novel principles and subject matter disclosed herein may be applied to other embodiments without the use of the innovative faculty. The claimed subject matter set forth in the claims is not intended to be limited to the embodiments shown herein but is to be accorded to the widest scope consistent with the principles and novel features disclosed herein. It is contemplated that additional embodiments are within the spirit and true scope of the disclosed subject matter.

I claim:

1. A method for monitoring viewing parameters of users in an immersive environment, the method comprising:
   receiving, by a processing unit, one or more real-time inputs from sensors associated with each of plurality of participants of an immersive environment, wherein the one or more real-time inputs represent at least one of location data, gaze data, field of view data and movement data of the plurality of participants;
   receiving, by the processing unit, a selection data from a user amongst the plurality of participants, wherein the selection data indicates one or more selected participants amongst the plurality of participants and at least one selected viewing parameter amongst plurality of viewing parameters of the plurality of participants;
   processing, by the processing unit, the one or more inputs to output the plurality of viewing parameters of the one or more selected participants, wherein the plurality of viewing parameters comprises at least one of viewing angle, viewing range, viewing angle deviation, current field of view, relative location and interaction status of the one or more selected participants;

generating, by the processing unit, first set of pictorial representations to represent the one or more selected participants and corresponding selected viewing parameters, for the user; and dynamically displaying, by the processing unit, the first set of pictorial representations in a predefined region within field of view of the user in the immersive environment, to enable monitoring of the plurality of viewing parameters.

2. The method of claim 1, further comprising:
prompting, by the processing unit, the user to dynamically input the selection data using one or more options in the predefined region.

3. The method of claim 1, wherein the viewing angle deviation indicates deviation of the viewing angle of each of the one or more selected participants from a predefined viewing angle set by the user.

4. The method of claim 1, wherein the relative location represents proximity between the one or more selected participants and the user, and amongst the one or more selected participants.

5. The method of claim 1, wherein the interaction status comprises, at least one of:
indication of at least two participants amongst the one or more selected participants interacting with each other,
indication of at least one of the one or more selected participants interacting with the user, and
indication of at least one of the one or more selected participants interacting with participant amongst the plurality of participants other than the one or more selected participants.

6. The method of claim 1, further comprising:
tracking, by the processing unit, placement of one or more selected objects present in the immersive environment;
generating, by the processing unit, a second set of pictorial representations including representation for the one or more selected objects; and
dynamically displaying, by the processing unit, the second set of pictorial representations in the predefined space relative to the at least one selected viewing parameters of the one or more selected participants.

7. A processing unit for monitoring viewing parameters of users in an immersive environment, the processing unit comprises:
one or more processors; and
a memory communicatively coupled to the one or more processors, wherein the memory stores processor-executable instructions, which, on execution, cause the one or more processors to:
receive one or more real-time inputs from sensors associated with each of plurality of participants of an immersive environment, wherein the one or more real-time inputs represent at least one of location data, gaze data, field of view data and movement data of the plurality of participants;
receive a selection data from a user amongst the plurality of participants, wherein the selection data indicates one or more selected participants amongst the plurality of participants and at least one selected viewing parameter amongst plurality of viewing parameters of the plurality of participants;
process the one or more inputs to output the plurality of viewing parameters of the one or more selected participants, wherein the plurality of viewing parameters comprises at least one of viewing angle, viewing range, viewing angle deviation, current field of view, relative location and interaction status of the one or more selected participants;
generate first set of pictorial representations to represent the one or more selected participants and corresponding selected viewing parameters, for the user; and
dynamically display the first set of pictorial representations in a predefined region within field of view of the user in the immersive environment, to enable monitoring of the plurality of viewing parameters.

8. The processing unit of claim 7, further comprises the processing unit to:
prompt the user to dynamically input the selection data using one or more options in the predefined region.

9. The processing unit of claim 1, wherein the viewing angle deviation indicates deviation of the viewing angle of each of the one or more selected participants from a predefined viewing angle set by the user.

10. The processing unit of claim 7, wherein the relative location represents proximity between the one or more selected participants and the user, and amongst the one or more selected participants.

11. The processing unit of claim 7, wherein the interaction status comprises, at least one of:
indication of at least two participants amongst the one or more selected participants interacting with each other,
indication of at least one of the one or more selected participants interacting with the user, and
indication of at least one of the one or more selected participants interacting with participant amongst the plurality of participants other than the one or more selected participants.

12. The processing unit of claim 7, further comprises the processing unit to:
track placement of one or more selected objects present in the immersive environment;
generate a second set of pictorial representations including representation for the one or more selected objects; and
dynamically display the second set of pictorial representations in the predefined space relative to the at least one selected viewing parameters of the one or more selected participants.

13. A non-transitory computer-readable medium including instructions stored thereon that when processed by one or more processors cause a system to perform operations comprising:
receiving one or more real-time inputs from sensors associated with each of plurality of participants of an immersive environment, wherein the one or more real-time inputs represent at least one of location data, gaze data, field of view data and movement data of the plurality of participants;
receiving a selection data from a user amongst the plurality of participants, wherein the selection data indicates one or more selected participants amongst the plurality of participants and at least one selected viewing parameter amongst plurality of viewing parameters of the plurality of participants;
processing the one or more inputs to output the plurality of viewing parameters of the one or more selected participants, wherein the plurality of viewing parameters comprises at least one of viewing angle, viewing range, viewing angle deviation, current field of view, relative location and interaction status of the one or more selected participants;

generating first set of pictorial representations to represent the one or more selected participants and corresponding selected viewing parameters, for the user; and dynamically displaying the first set of pictorial representations in a predefined region within field of view of the user in the immersive environment, to enable monitoring of the plurality of viewing parameters.

14. The non-transitory computer-readable medium of claim 13, further comprising:

prompting the user to dynamically input the selection data using one or more options in the predefined region.

15. The non-transitory computer-readable medium of claim 13, wherein the viewing angle deviation indicates deviation of the viewing angle of each of the one or more selected participants from a predefined viewing angle set by the user.

16. The non-transitory computer-readable medium of claim 13, wherein the relative location represents proximity between the one or more selected participants and the user, and amongst the one or more selected participants.

17. The non-transitory computer-readable medium of claim 13, wherein the interaction status comprises, at least one of:

indication of at least two participants amongst the one or more selected participants interacting with each other, indication of at least one of the one or more selected participants interacting with the user, and indication of at least one of the one or more selected participants interacting with participant amongst the plurality of participants other than the one or more selected participants.

18. The non-transitory computer-readable medium of claim 13, further comprising:

tracking placement of one or more selected objects present in the immersive environment;

generating a second set of pictorial representations including representation for the one or more selected objects; and dynamically displaying the second set of pictorial representations in the predefined space relative to the at least one selected viewing parameters of the one or more selected participants.

* * * * *